Jan. 22, 1963 L. R. RABB 3,074,270
TORSION BALANCE AND MOISTURE TESTING APPARATUS
Filed Nov. 4, 1957 4 Sheets-Sheet 1

INVENTOR
LESTER R. RABB
ATTORNEYS

Jan. 22, 1963 L. R. RABB 3,074,270
TORSION BALANCE AND MOISTURE TESTING APPARATUS
Filed Nov. 4, 1957 4 Sheets-Sheet 2

INVENTOR
LESTER R. RABB
by
Mason, Kolehmainen, Rathburn and Wyss.
ATTORNEYS.

Jan. 22, 1963 L. R. RABB 3,074,270
TORSION BALANCE AND MOISTURE TESTING APPARATUS
Filed Nov. 4, 1957 4 Sheets-Sheet 3

INVENTOR
LESTER R. RABB
by
Mason, Kolehmainen, Rathburn and Wyss
ATTORNEYS

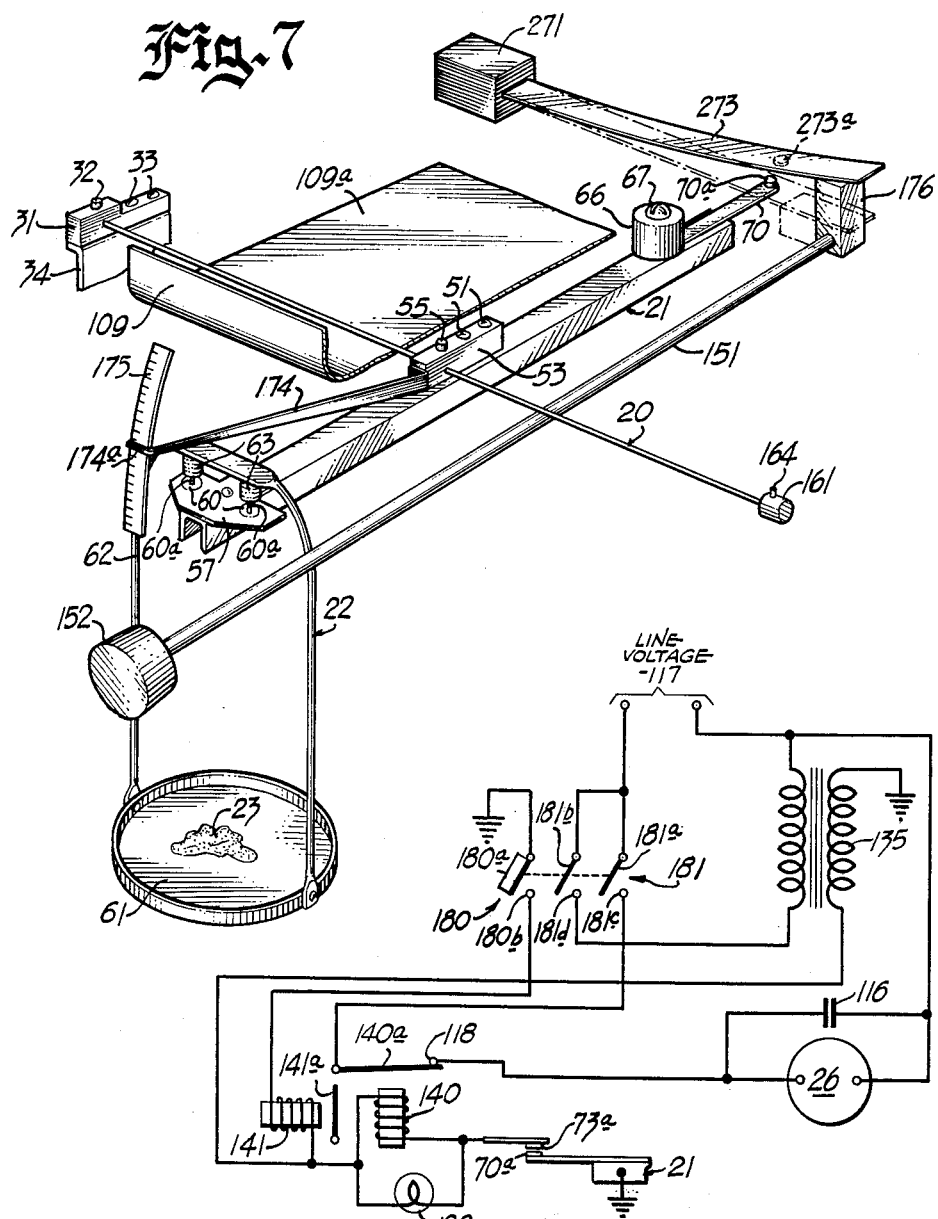

United States Patent Office 3,074,270
Patented Jan. 22, 1963

3,074,270
TORSION BALANCE AND MOISTURE
TESTING APPARATUS
Lester R. Rabb, Evanston, Ill., assignor to Moore-Milford Corporation, Skokie, Ill., a corporation of Illinois
Filed Nov. 4, 1957, Ser. No. 694,327
11 Claims. (Cl. 73—76)

The present invention relates to torsion balance apparatus and, more particularly, to a torsion balance system for measuring the moisture percentage of various materials or for determining the weight of various materials.

The torsion type of balance system is well known and has been embodied in weighing devices for measuring the weight of various materials. Generally speaking, a torsion rod or the like under tension carries a balance beam from which is suspended a pan assembly used to support a sample of material. The balance beam and pan, without a load, are adjusted initially to equilibrium or balance and thereafter a load on the pan upsets the balance or equilibrium by exerting torsion on the torsion rod. The amount of twisting or rotation of the torsion rod required to reestablish balance or equilibrium of the system is a measure of the weight of the load. A scale is generally provided to measure the amount of twisting required to reestablish balance or equilibrium and may be calibrated in units of weight, such as grams or milligrams.

A torsion balance can also be used to measure weight loss of materials, e.g., moisture content after heating. In such an operation, the actual weight of the sample need not be measured and the device which measures the amount of twisting of the torsion rod need not be calibrated in units of weight. Any numerical scale is satisfactory if the weight loss is to be measured in percentage of the initial weight of the sample. In a moisture testing operation, an amount of sample sufficient to produce a predetermined amount of twisting of the torsion rod is placed on the pan. The system is then balanced and a conventional heater is disposed adjacent to the surface of the sample in order to drive off or to cause evaporation of the moisture from the sample, whereupon an unbalance in the system is effected. This unbalance is proportional to the moisture content of the sample and is determined by a pointer directly or indirectly operated by the balance beam, which pointer scans a scale calibrated directly in weight loss or moisture percentage. The weight loss must be measured immediately after the heating operation is completed, otherwise the sample may regain weight by absorption of moisture or gases from the atmosphere. Prior apparatus requires that the heating operation be terminated manually at the end of a preselected period of time and the sample reweighed manually to measure weight loss.

In order to obtain an accurate indication of the percent of moisture contained within any sample of material, it is necessary that the sample be heated for an optimum period of time. Excessive heating of the sample usually results in its charring or burning whereby a change other than loss of moisture is obtained in the characteristics or properties of the material with attendant incorrect results. Moreover, when the sample is not excessively heated, the sample may not be heated for an adequate period of time with the result that all of the moisture contained within the material is not removed. While the optimum heating time for various types of materials has been determined experimentally and is used as a guide in the moisture-testing operation, nevertheless the operators, who conduct the moisture-measuring tests, in the interest of productivity generally attempt to perform other tasks during the heating of the sample. Accordingly, due to inattention or preoccupation with other tasks, the heating of the sample is frequently and unnecessarily extended.

Accordingly, it would be desirable to provide a moisture-measing apparatus wherein the heating of the sample would be arrested automatically and instantly after a predetermined period of time without requiring the attention of the operator. Moreover, it would be advantageous to provide automatic means of weighing immediately at the conclusion of a test to prevent errors from moisture regain. Also it would be advantageous to provide a counter means which would directly indicate and preserve or record the moisture percentage contained in the sample, without requiring the use of conversion tables or mathematical computations, the counter means being operated simultaneously with the weighing operation so that any following change in the sample would not affect the final result. Therefore, it is an object of the present invention to provide a torsion balance apparatus adapted to be used as a moisture measuring device and embodying the desirable characteristics mentioned above.

It is an other object of the present invention to provide a torsion balance apparatus adapted to be used as a torsion balance device wherein the weight of a load is accurately obtained and recorded automatically.

Another object of the invention is to provide a torsion balance apparatus which embodies means for establishing a balance or equilibrium condition after dispositon of a load on the apparatus and for recording the weight of the load automatically.

It is another object of the present invention to provide a moisture measuring apparatus for accurately obtaining the moisture percentage of a sample of material.

A further object of the present invention is to provide a moisture measuring apparatus wherein a sample of material is heated at an optimum temperature for an optimum predetermined period of time, thereby obviating overheating of the sample with the attendant decomposition of the material or underheating with obviously low results.

It is another object of the present invention to provide a moisture measuring apparatus employing an electrical circuit for balancing the apparatus after a predetermined period of time and for operating a counter to not only indicate but record the moisture percentage of a sample of material.

It is still another object of the present invention to provide a moisture-measuring apparatus wherein the heating of the sample is terminated after a preselected period of time and an indication of the moisture content of the sample is automatically obtained.

Yet another object of the present invention resides in the provision of a heater means which is movable at the termination of the predetermined heating period from a sample-heating position to a non-heating position wherein the heating source remains in a heated condition thereby eliminating preheating periods for subsequent tests.

A further object of the present invention is to provide a moisture measuring apparatus in which an audio and video signal is used to indicate the termination of a moisture-measuring test run.

Yet another object of the present invention is to provide a moisture-measuring apparatus embodying means responsive to the balancing of the apparatus for rendering effective an electrical circuit which effects the determination of the moisture percentage of a sample.

It is another object of the present invention to provide cover means for a torsion member thereby to insulate the member from the heat developed by a heater unit.

It is a further object of the present invention to provide an infra-red heater unit for moisture-measuring equipment which gives more rapid heating of the sample than can be achieved by other heaters.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 7 is a fragmentary perspective view of the torsion balance apparatus; and

FIG. 8 is a schematic view of an electric circuit used in another embodiment of the torsion balance apparatus.

Figure 1:
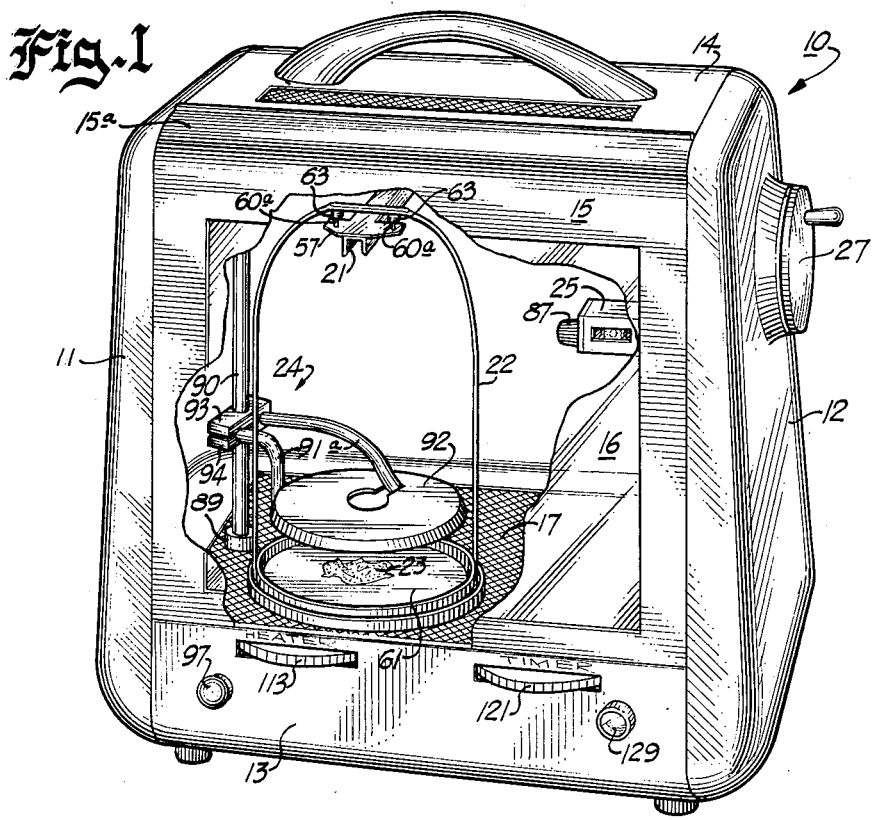
FIG. 1 is a perspective view of a torsion balance apparatus characterized by the features of the present invention, shown as used as a moisture-measuring device.

The above and other objects are achieved in accordance with the present invention by providing a torsion balance apparatus which in one embodiment of the present invention functions as a moisture-measuring device to determine the weight loss of a sample of material after a predetermined period of time. This apparatus embodies a torsion balance system comprising a balance beam secured to a torsion member and from which is suspended a pan assembly. The apparatus is first balanced by twisting the torsion member in a selected direction to a definite state of unbalance and then operating a prime mover in driving engagement with the torsion member until the torsion member is untwisted by an amount adequate to return the apparatus to a balanced condition. In response to movement of the beam into balance, the prime mover is deenergized immediately, thereby stopping the torsional movement at equilibrium. A counter means, conveniently a 3-digit counter, in driving connection with an end of the torsion member is then set to zero in order to provide an accurate basis for measurement of the relative distortion of the torsion member after a moisture-measuring operation. (The 3-digit counter thus divides the amount of twisting of the torsion member into 1000 parts.) The apparatus is then unbalanced by manually twisting the torsion member an appropriate amount, such as approximately 240°, or 2/3 of one revolution, such that the counter means is returned to a zero position, thus preloading the torsion member.

A sufficient amount of material is placed in the pan assembly to cause the untwisting of the torsion member until the balance beam is again brought into equilibrium. Thereafter, the torsion member is again twisted slightly to effect an unbalance of the balance beam sufficient only to deenergize the prime mover. The moisture-measuring test run is initiated by setting a timer mechanism for a predesignated period of time and moving a heater means from its non-heating to its heating position directly above the sample in the pan assembly. After a preselected period of time, corresponding to the optimum heating period for the particular test material, the timer mechanism causes the heater means to be displaced to its non-heating position and the prime mover to be actuated to untwist the torsion member until it is brought back into a new balanced condition. Incident to movement of the beam into the new balanced condition, the prime mover is deenergized and the movement of the torsion member is immediately arrested because of a magnetic clutch provided in the prime mover. The weight loss of the sample corresponding to moisture content may be obtained directly by reference to the counter means since it is in direct geared engagement with the prime mover and records in parts per thousand the amount of untwisting of the torsion member to its new balance position.

In another embodiment of the invention, the torsion balance apparatus is used as a torsion balance device and, to this end, as noted above, the apparatus is first balanced by twisting the torsion member in a selected direction and then by operating the prime mover until the torsion member is untwisted to return the apparatus to a balanced condition. In response to movement of the beam into balance, the prime mover is deenergized immediately. The counter means is then set to zero and an object to be weighed is placed on the pan assembly and the prime mover is actuated to untwist the torsion member until it is brought back into a balanced condition. When the beam reaches a balanced condition, the prime mover is deenergized and the movement of the counter means and torsion wire is arrested. The weight of the object on the pan may be read directly from the counter which indicates the amount of twist in the torsion member and provides a reading proportional to the weight of the sample.

Referring now to the drawings, there is illustrated in FIGS. 1 through 7 one embodiment of the present invention showing a torsion balance apparatus 10, as used as a moisture-measuring device for measuring the moisture percentage of various materials, for example, grain or cereal, and there is schematically illustrated in FIG. 8 an electric circuit used in another embodiment of the torsion balance apparatus according to the present invention. Considering now the embodiment of FIGS. 1 through 7, the apparatus 10 includes a frame comprising spaced apart end walls 11 and 12 which are suitably interconnected by a front panel 13 and a top and back panel 14, and a perforated floor panel 17. A door 15 has its deformed upper portion 15a hingedly attached to the top panel 14 and is so constructed that when elevated to an open position the portion 15a seats on the panel 14 and maintains the door in an open position. A window 16, made of heat resistant glass, or the like heat resistant transparent material, is provided centrally of the front part of the door 15 to permit viewing of the interior of the apparatus 10.

Figures 2, 5:
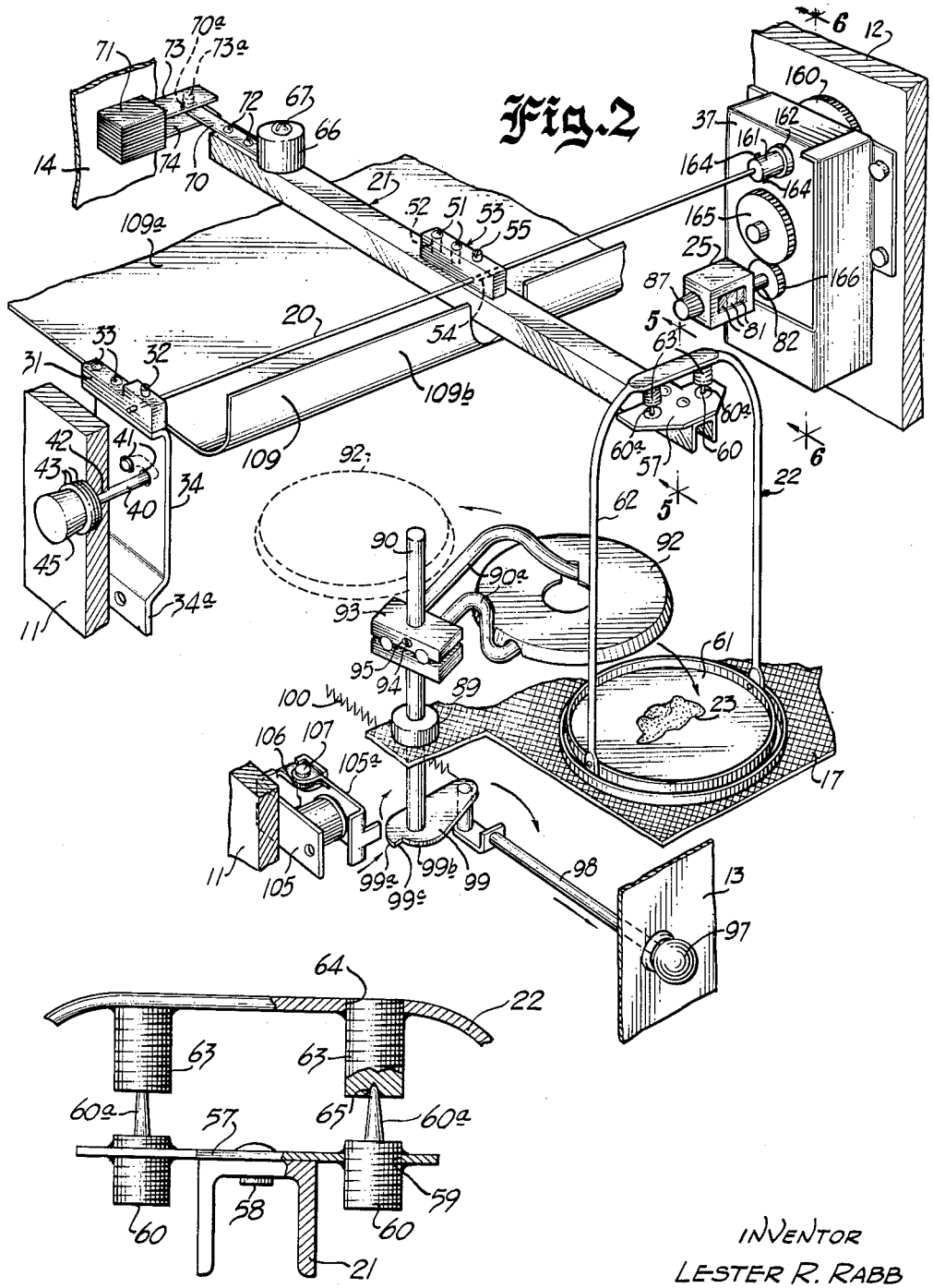
FIG. 2 is a diagrammatic-schematic view of the apparatus of FIG. 1.
FIG. 5 is a sectional view taken along lines 5—5 of FIG. 2 shown with a portion broken away.

Briefly, as shown in FIGS. 1 and 2, the apparatus comprises a torsion member 20 which is maintained under tension by spring bracket 34 and is supported between the spaced-apart walls 11 and 12. Fixedly secured intermediate the ends of the torsion member 20 is a balance beam 21 from which is suspended a pan assembly 22 for supporting a predetermined quantity of material, identified as 23. A heater unit 24 is movably mounted in the frame of the apparatus 10 in order selectively to try out or drive off volatile material such as moisture in the sample 23. To indicate the relative angular position of the torsion member 20, there is provided a rotational counter means 25 which is drivingly connected to the right end of the torsion member 20. The same end of the torsion member to which the counter means 25 is connected is rotatable by means of a gear motor 26 and gear train in the housing 37 or by means of a manually operable wheel 27, whereby the torsion member 20 and balance beam 21 may be moved to either an unbalanced or a balanced condition. Both the position of the heating unit 24 and the counter means 25 and gear motor 26 are operated under the control of an electrical circuit 28 (see FIG. 3) after the material 23 has been heated for an optimum period of time as determined by the setting of a timer mechanism 118.

Referring now more particularly to the torsion member 20, it comprises a wire, strap, rod or a combination of the same, preferably made from a material having a high limit of elasticity, such as alloy steel and the like which have proven to give very satisfactory results. The torsion member 20, hereinafter called torsion wire 20, is suspended between the walls 11 and 12, and, to this end, its left end (as viewed in FIGS. 2 and 4) is fixedly secured to a block 31 by a set screw 32 threaded through an aperture 31a into frictional engagement therewith. The block 31 is fixedly secured by fasteners 33 to a flanged end of a bracket 34 of generally Z-shaped configuration, which bracket 34 has an offset portion 34a provided with apertures for accommodating a plurality of fasteners 35 driven into the wall 11. The right end portion of the torsion wire 20 is fixedly secured by dog point set screws 164 within a longitudinal bore of a final drive shaft 161 which is journaled within a pair of bearings 162, 163 supported by the walls of a housing 37 and which is attached to a gear 160 seated against a thrust bearing 38 resting on the bearing 163. By this construction, the right end of the wire 20 is restrained against longitudinal movement yet is free to rotate or to be twisted in the bearings. The hand wheel 27 is mounted on a shaft 39 on which is secured a gear 159 in driving engagement with the gear 160, whereby rotation of the hand wheel 27 effects a twisting of the right end portion of the wire 20 such that a torsion force or torque is developed or applied to the wire 20.

Figure 4:
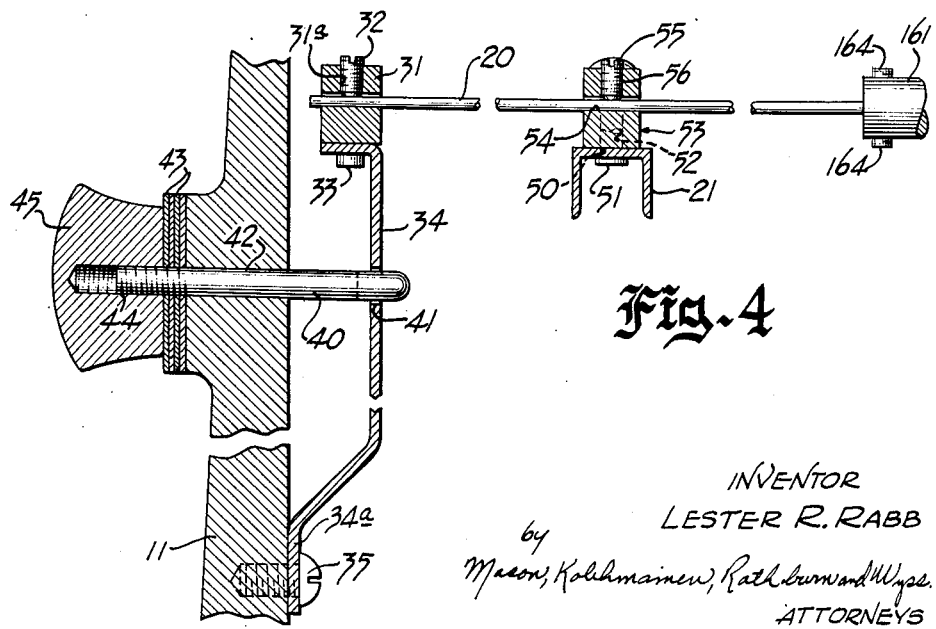
FIG. 4 is an enlarged fragmentary view of a torsion member shown in FIG. 2 and its supporting means.

In order to hold the torsion wire 20 taut between the walls 11 and 12 so that the wire 20 may effectively support the balance beam 21, the tension of the wire 20 is adjustable. To this end, as shown in detail in FIGS. 2 and 4, a rod 40 is connected to the bracket 34 so that both its body and its reversed end are inserted through respective apertures 41 (FIG. 2) in the bracket 34. The body of the rod 40 also extends through an aperture 42 defined in the wall 11 and is free to move longitudinally therein. As shown in FIG. 4, the left end of the rod 40 is disposed through a plurality of wave washers 43 and is threaded to engage a central bore in a knob 45, which wave washers permit rotation of the knob 45 relative to the wall 11. If, for example, the knob 45 is rotated in a clockwise direction as viewed in FIG. 2, the rod 40 is drawn into the bore 44 of the knob 45 with the result that the wave washers 43 are compressed and the bracket 34 is pivoted about its fasteners 35 whereby the block 31 and the left end of the wire 20 are moved toward the wall 11. Thus, the torsion wire 20 is stretched and the tension of the wire 20 correspondingly increased. If, however, the knob 45 is rotated in a counterclockwise direction, the rod 40 is withdrawn from the bore of the knob 45, and the block 31 and the left end of the wire 20 are pivoted about the fasteners 35 and moved away from the wall 11 under the action of the tension force in the wire 20.

The balance beam 21 is manufactured from relatively light-weight material and has preferably a channel cross section to prevent bending or deformation of the beam. The beam 21 is carried adjacent to its central portion by the torsion wire 20 so that the wire 20 and the beam 21 both rotate or move angularly together. In this connection, intermediate the ends of the balance beam 21 is provided a pair of apertures 50 for respectively accommodating a pair of fasteners 51 which are threaded in respective apertures 52 in a block 53. The block 53 is thus fixedly secured to the balance beam 21 and is provided with a transverse bore 54 through which the torsion wire 20 is passed. Moreover, in order to fixedly attach the block 53 and the wire 20 together, a set screw 55, as best shown in FIG. 4, is threaded through an aperture 56 in the block 53 into frictional engagement with the wire 20, whereby the frictional engagement between the screw 55, the wire 20 and the block 53 prevents relative rotation of the balance beam 21 and the torsion wire 20. It will be appreciated that if the right end of the wire 20 is twisted anti-clockwise (as viewed from the right hand side of FIG. 2), the rear end of the beam 21 is elevated and the front end is lowered. For the purpose of this description the reference to the direction of rotation of the wire 20 and the hand wheel 27 will be considered as being made from the right side of FIGS. 1 and 2, while reference to ends of the wire 20 and the balance beam 21 will be made from the front of FIGS. 1 and 2, unless indicated otherwise.

In order to hold a sample of material during a test operation, the pan assembly 22 is suspended from the front end of the balance beam 21 such that both a stirrup assembly and the front end of the beam 21 are raised and lowered together. As shown in FIGS. 2 and 5, a generally rectangular plate 57 is secured to the beam 21 by fasteners 58 and includes a pair of spaced apart apertures 59 for respectively receiving a pair of threaded members 60 having conical pivotal extensions 60a for supporting the pan assembly 22. More specifically, the stirrup assembly comprises a pan 61 fixedly attached to the ends of a yoke 62 which includes at its arch a pair of downward projecting pivoted bearings 63. Each bearing 63 consists of a bolt threaded into an aperture 64 so as to depend downwardly from the arch of the yoke 62. The lower ends of the bearings 63 are preferably fitted with conically recessed pivots as indicated at 65 to respectively accommodate the upwardly directed extensions 60a on the front end of the beam 21.

The torsion balance apparatus 10 can be made essentially free of friction and inertia by suspending the stirrup assembly directly from another torsion wire held taut between anchors attached to the plate 57. In this way the bearings 63 and the pivotal extensions 60a may be eliminated and a more sensitive balance produced which may be desirable for unusually accurate measurements.

By utilizing a pair of extensions 60a and cooperating recesses 65, the balance beam is prevented from pivoting or oscillating in a direction transversely of the balance beam 21. Either the pan 61 may be directly filled with material 23, or a shallow dish or liner (not shown) may be placed on the pan 61.

In order to offset or counterbalance the weight of the pan assembly 22, a counterweight 66 is secured to the rear end of the balance beam 21 by a fastener 67. If the counterweight and pan assembly movement arms are equal, the capacity of the torsion wire 20 may be doubled by using a counterweight having a weight equal to the weight of the pan assembly plus original weight capacity of the torsion wire. Specifically, if a torsion wire has a weight capacity of 10 grams and the pan assembly weighs 4 grams, then the capacity of the torsion wire may be doubled by using a counterweight weighing 14 grams.

Whenever the beam 21 is in a substantially horizontal position, referred to hereinafter as a balanced condition, a contact arm 70 attached to the rear end of the beam 21 by a pair of fasteners 72 engages a limit switch 71 attached to the panel 14. The limit switch 71 is included in the electrical circuit and performs an operative function described below. The contact arm 70 is electrically connected to the grounded frame through the beam 21, the block 53, the torsion wire 20 and the bracket 34. More particularly, the limit switch 71 includes an upper contact arm 73 having a contact 73a vertically aligned with a contact 70a on the contact arm 70, which contacts 70a and 73a are mounted on the upper and lower surfaces of the arms 70 and 73, respectively, for engagement with one another. When in engagement the contacts 70a and 73a prevent further upward movement of the contact arm 70 and thus, the rear end of the beam 21. In addition, the switch 71 includes a lower arm 74 spaced apart from and vertically aligned with the upper arm 73, thereby to engage the bottom surface of the contact arm 70 incident to downward movement of the rear end of the beam 21. Accordingly, the upper and lower arms 73 and 74 limit the upward and downward movement of the rear end of the beam 21 and, hence, limit the rotational movement of the central portion of the torsion wire 20. It will be understood that if the right end of the wire 20 is twisted in a clockwise direction by the hand wheel 27 (the hand wheel being turned anti-counter-clockwise), the rear end of the beam 21 will rest on the lower arm 74. Incident to the rotation of the right end of the wire 20 in a clockwise direction by the hand wheel 27, the contact 70a is raised into engagement with the contact 73a, whereby the beam 21 is returned to a balanced condition. The making of the contacts 70a and 73a, which signifies a balance in the apparatus, closes a circuit in the electrical circuit 28 to perform an operative function hereinafter described.

Figure 6:
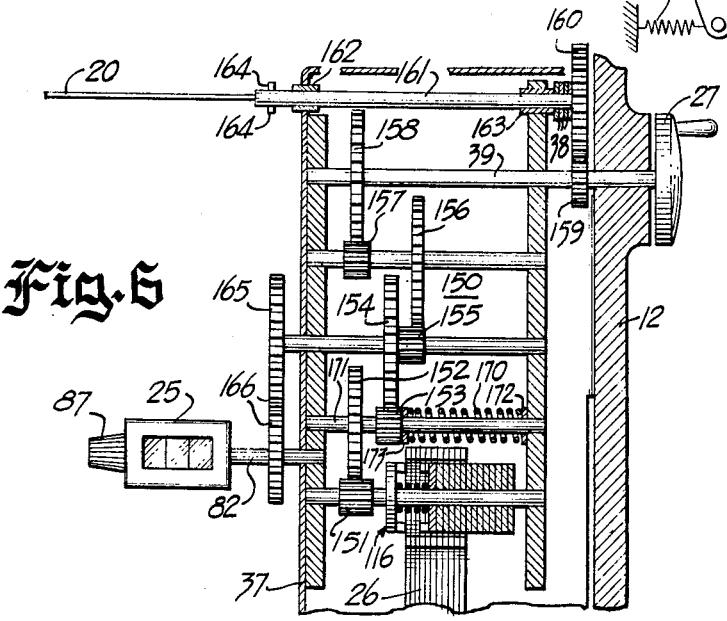
FIG. 6 is a sectional view taken along lines 6—6 of FIG. 2.

For the purpose of indicating directly the percentage of moisture of a sample 23 after a moisture-measuring operation is completed, a digital counter 25, as shown in FIG. 6, is mechanically driven by a gear train connected to the right end of the wire 20. Hence, the counter 25 identifies the relative angular position of the right end of the wire 20, and, to this end, it includes three indicator cylinders 81 having digits from 0 through 9, respectively, marked thereon, which cylinders collectively indicate tenths of a percent of the moisture content of the sample tested. The cylinders are in driving engagement with the right end of the torsion wire 20 by a shaft 82 and a gear train comprising spur gears 166, 165, 154, 155, 156, 157, 158, 159, 160 and shaft 161. It will thus be apparent that the counter 25 is directly controlled by the right end of the wire 20 and that in response to selective rotary movement of the wire 20, the indicator cylinders 81 are operated accordingly. The indicator cylinders 81 are also operated by a reset button 87 which is adapted to be manually rotated to reset the indicator cylinders 81 to their zero positions without changing the torque on the torsion wire. To prevent movement of the above described gear train during resetting of the indicator cylinders 81 by the knob 87, either of the exposed gears 165 or 166 may be held and restrained from rotation by the operator.

In order that the counter 25 reads directly in a percentage of moisture of the material 23, only a predetermined quantity of material is placed on the pan 61. To this end, after the beam 21 has been balanced with the pan 61 empty, as indicated above, and the counter set to zero, the hand wheel 27 is rotated in an anti-clockwise direction to twist the torsion wire 20 in a clockwise direction until the counter 25 is returned through a full cycle to its zero-indicating position. With the wire 20 preloaded in the clockwise direction, a sufficient quantity of sample material 23 is then placed on the pan 61 to cause the balance beam 21 to return to a balance condition in which the contacts 70a and 73a are in engagement. This condition may be visually observed by a pointer attached to the block 54 which scans a scale, or alternatively, by a light 129 which is energized by a circuit closed by making of the contacts 70a and 73a incident to engagement of the arm 70 with the arm 73.

At the point of equilibrium with the beam hovering about the balance position the contacts 70a and 73a open and close the light circuit, thereby causing the light 130 to flash on and off. Once the proper amount of sample is obtained, it should be spread evenly over the pan 61 to avoid non-uniform heating of the material.

In a modified form of the first embodiment shown in FIG. 7 there is additionally provided a pointer 174 which is secured to the block 53 and which has a tip 174a superimposed over a scale 175 supported from the frame. The scale 175 may include a plurality of index lines, as shown, or a single reference index line, which in cooperation with the pointer 174, provides an indication of the amount of off balance during placement of the sample on the pan 61. In order to avoid intermittent operation of the light 129, a knob 152 mounted on the end of a shaft journaled in the frame is rotated to operate a cam 176. The cam raises an arm 273 of a switch 271 and moves the arm contact 273a out of range of the contact arm 70 and allows the beam 21 to swing freely through the point of equilibrium. In order to permit displacement of the contact 273a from the contact 70a, the arm 273 is flexible and has a greater length than the arm 73 illustrated in FIG. 2. The true position of the beam 21 and thus the exact amount of off-balance is readily determined by reference to the scale whereby the placement or removal of material on or from the pan 61 necessary to produce a balanced condition is facilitated.

Figure 3:
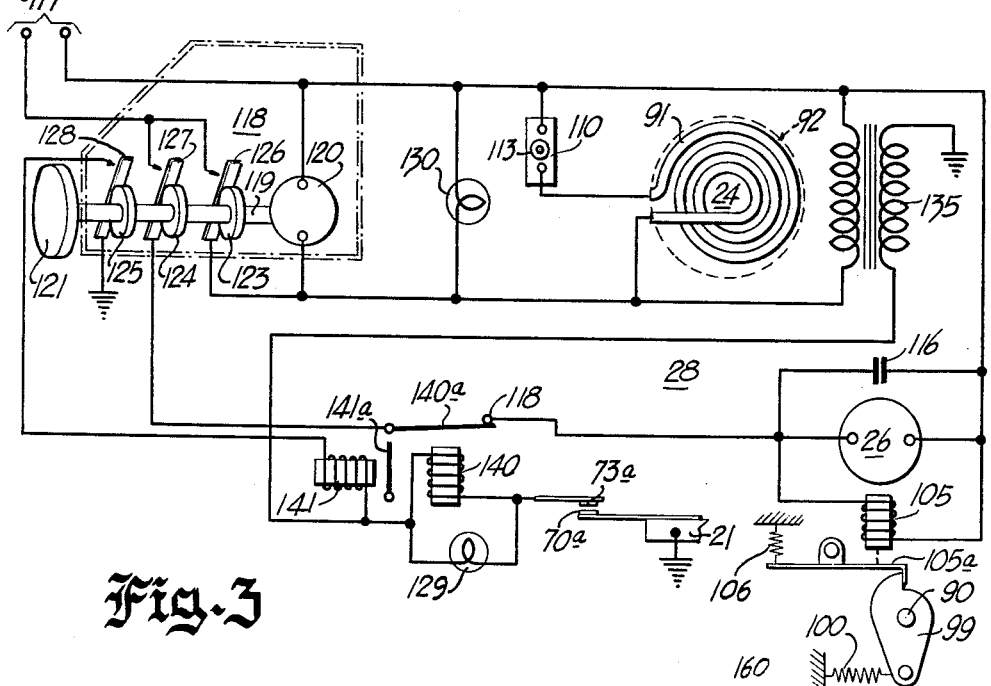
FIG. 3 is a schematic view of an electrical circuit embodied in the apparatus of FIG. 1.

In order to heat the sample during a moisture-measuring operation, there is provided a heater unit 24 supported from a vertical rod 90 which is rotatably mounted at its upper end in a bushing (not shown) attached to the panel 14 and at its lower end by a bushing 89 attached to the floor 17. More specifically, the heater unit 24 includes a sheathed infra-red heating element 91 having its central part distorted and wrapped in a spiral fashion in a planar surface and a cup-shaped heat reflector 92 attached to the upper portion of the sheathed heating element 91 to direct substantially all of the heat generated by the sheathed heating element downward toward the sample 23. The ends 91a of the element 91 extend out from the reflector 92 and are secured to a support assembly 93 by appropriate means, which assembly 93 is vertically movable into selected positions on the rod 90 to alter the distance of the heater from the sample. To this end, a set screw 94 is inserted through an aperture 95 in the assembly 93 into frictional engagement with the rod 90. In order to heat the element 91 a pair of conductors (not shown in FIG. 2) are connected to the ends of the element 91 as illustrated in FIG. 3, to be energized by a line voltage source 117 under the control of the electrical circuit 28.

In accordance with a feature of the invention, the heater unit 24 is movable between a sample-heating position, as illustrated in solid lines in FIG. 2, and a non-heating position, as illustrated in dotted lines in FIG. 2. As shown, when the heater unit 24 is in its heating position, the sheathed heating element 91 is disposed directly above the pan 61 and sample 23, and when in its non-heating position the sheathed heating element 91 is displaced away from the pan 61 so that the sample 23 is not heated. In order to move the unit 24 from its non-heating to its heating position, a knob 97 located in the lower front panel 13 is manually pulled forward. The knob 97 is connected to a bar 98 which is journaled in the panel 13 and which has its other end pivotally connected to a cam 99 fixedly secured to the rotatable rod 90. For this purpose of biasing the heater element 24 and the rotatable rod 90 into their non-heating positions a spring 100 is connected between the cam 99 and the frame of the apparatus 10. Incident to forward movement of the bar 98, the cam 99 is rotated in a clockwise direction, as viewed in FIG. 2, with the result that the cam 99 is latched into position by a latching magnet 105 operated by the electrical circuit 28. Specifically, the magnet 105 is mounted on the wall 11 so that its latching armature 105a rides on the camming surface 99a of the cam 99 under the influence of a spring 106. At the end of the longitudinal movement of the rod 98 and the clockwise movement of the cam 99, (as viewed from the top of the rod 98), the armature 105a is pivoted about pins 107 by the spring 106 into engagement with the latching surface 99b, thereby to obstruct the counterclockwise return movement of the surface 99c under the control of the spring 100. Energization of the latching magnet 105 under the control of the electrical circuit 28 causes the armature 105a to pivot free of the surface 99c, thereby to permit the counter-clockwise rotation of the cam 99 and displacement of the heater unit 24 to its non-heating position.

The object of a good moisture-measuring test is to remove all of the moisture in the sample 23 without causing any appreciable changes, such as oxidation, decomposition or the like, in the sample. In order to control the quantity of heat in accordance with the characteristics of the material to be heated, two adjustments are provided. First, as indicated above, the heater unit 24 may be raised or lowered relative to the pan 61 and sample 23 by adjustment of the set screw 94 in the supporting assembly 93. It has been found that a distance of 1⅜ in. between the sheathed heating element 91 and the pan 61 is adequate for the greatest number of heat-sensitive materials, including most organic materials. However, such materials as crushed rock, asbestos, mica, and the like, can safely be subjected to extremely high temperatures and accordingly the heater element 24 may be positioned very close to the pan 61 without adversely affecting the charateristics of the material. In this matter, the heating time of the latter material is appreciably decreased with safety.

The second adjustment involves controlling the quantity of heat developed by the heater unit 24 or particularly involves controlling the temperature of the sheathed heating element 91. Accordingly, there is provided a switch or control unit 110 in the electrical circuit 28 for controlling the input of electrical energy to the heating element 91. The switch 110 includes a temperature control dial 113, illustrated in FIG. 1 as partially extending through the front panel 13, which dial of course determines the temperature of the heating element 91 during operation of the unit 24. The dial 113 controls the action of a thermal responsive device (not shown) which is operable to open and close switch contacts (not shown) to maintain the heating element 91 at the temperature designated by the control dial. Particularly, the thermal device opens the contacts when the temperature of the element is equal to the setting of the dial thereby stopping the current flow to the element and closes the contacts when the temperature of the element is lower than the dial setting thereby causing current to flow through the element. Alternatively, it will be appreciated that a rheostat may be used instead of the switch 110 described above. As is well known the rheostat may be adjusted to vary the magnitude of current continuously supplied to the heating element 91, whereby the temperature of the heating element 91 is controlled by the setting of the rheostat. However, the rheostat would not have the advantage of nullifying line voltage fluctuations as does the switch 110.

It is well known that a material which has a high heat sensitivity must be heated at a low temperature over a longer period of time to avoid altering the properties of the material. On the other hand, a material which is relatively insensitive to heat, for example minerals and the like, may be heated at an extremely high temperature to effect a complete drying operation as rapidly as possible. From the foregoing description, it will be appreciated that the height and the temperature of the heating unit 24 may be controlled in accordance with the type of material to be tested.

For the purpose of preventing unnecessary heating of the torsion wire 20 with its attendant deformation, a protective cover 109 is suitably carried by the panel 14 so that it underlies the wire 20 and intercepts the heat radiating from the heater unit 24. The cover 109 has a substantially horizontal body portion 109a extending from the panel 14 forward of the wire 20 and from which a flange 109b depends upwardly, with the result that the wire 20 and a major part of the beam 21 are isolated from the sheathed heating element. Moreover, the cover is made from material which has high heat reflecting characteristics and low heat transmitting characteristics whereby only a nominal amount of heat reaches the wire 20.

The electrical circuit 28, as illustrated in FIG. 3, includes a timer mechanism 118 which controls the time sequence of operation of the apparatus. The timer mechanism 118 is of the conventional type and includes a control or timer shaft 119 driven by both a timer motor 120 energized by the line voltage 117 and a control knob 121 extending partially through the panel 13. Fixedly secured to the shaft 119 are cams 123, 124 and 125 which respectively operate pairs of contacts 126, 127 and 128 for selected periods during a single rotation of the timer shaft 119. The cam 123 is configured to close the contacts 126 throughout the entire 60-minute cycle, the cam 125 is configured to close the contacts 128 for 5 seconds at approximately two minutes from the end of the 60-minute cycle, and the cam 124 is configured to close the contacts 127 for 30 seconds at approximately one and one-half minutes from the end of the cycle. Rotation of the control knob 121 from its normally off position to any position in its operative 60-minute cycle effects the closure of the contacts 126, whereby the line voltage 117 energizes the timer motor 120, a case light 130 (mounted inside an upper corner of cabinet), the on-off switch 110 for operating the heater unit 24, and a transformer 135 which supplies an energizing voltage of approximately 24 volts to operate a latching relay 140 and a reset relay 141. However, neither of the relays 140 or 141 are operated at this point since their respective circuits to ground are opened by the beam switch contacts 70a and 73a and the contacts 128. The energized timer motor 120 thereafter drives the control shaft 119 and sequentially operates the contacts 127 and 128 after a predetermined period of time depending upon the initial operative position of the control knob 121. Thus, if the knob 121 is initially set to provide a 30-minute cycle, the contacts 128 are closed for 5 seconds at the end of the 28th minute and the contacts 127 are closed for 30 seconds at the end of the 28th and one-half minute. Assuming that the contacts 70a, 73a of the limit switch 70 are opened as they would be by a loss in sample weight, the closure of the contacts 128 at the end of the 28th minute completes the transformer energizing circuit for the relay 141 with the result that its armature 141a resets the armature 140a of the relay 140 into operative position whereby contacts 118 are closed in a gear motor-latching relay circuit. The closure of the contacts 118 only prepares the gear motor-latching relay circuit for operation since the circuit is opened by the contacts 127 controlled by the cam 124. However, at the end of 28 and one-half minutes, the contacts 127 are closed by the cam 124 and the line voltage 117 is applied to the latching magnet 105 whereupon the heater unit 24 is automatically displaced from its heating to its non-heating position to terminate the actual heating operation. The closure of the contacts 127 also causes a magnetic clutch 116 and gear motor 26, housed within the enclosure 37, to operate and, as indicated in FIG. 6, the gear motor 26 drives the right end of the torsion wire 20 through the clutch 116, a gear train 150 including gears 151, 152, 153, 154, 155, 156, 157, 158, 159 and 160, and the shaft 161, the gear 160 being fixedly secured to the shaft 161 which is fixedly attached to the wire 20 as described. Moreover, the gear motor 26 also drives the counter 25 through gears 151, 152, 153 and 154 and gear 165 and 166. As indicated above, it will be appreciated that the counter 25 is in driving engagement with the right end of the torsion wire 20 through the shaft 161 and the gears 160, 159, 158, 157, 156, 155, 165 and 166. The gear motor 26 is a conventional A.C. motor and accordingly drives the torsion wire 20 and the counter 25 and untwists the right end of the wire 20 in one preselected angular direction. The torsion wire 20 is rotated only in an anticlockwise direction to elevate the rear end of the beam 21 and move the beam 21 into a balanced condition wherein the contacts 70a and 73a are closed. As illustrated in FIG. 3, closure of the contact 70a and 73a completes the transformer circuit for the relay 140 with the result that the armature 140a is displaced to open the contacts 118 and deenergize the gear motor 26, the clutch 116 and the magnet 105. Deenergization of the clutch 116 immediately releases the gear motor 26 from the gear train 150 and the wire 20 so that any inherent inertia of the motor does not overdrive the right end of the wire 20 (and hence the counter 25) through or past the balanced condition. The inherent friction of the hand wheel 27, the two gear trains and the counter 25 effectively brakes the rotation of the wire 20 whereby the counter 25 provides an accurate indication of the angular position of the wire 20 when the torsion balance system is balanced.

In another modified form of the first embodiment, there is additionally provided an adjustable friction brake to assure that the counter is stopped when the system is in balance. Even though the friction brake is employed there may be a slight amount of overrun, which does not adversely affect the counter reading since during the initial balancing of the system the same overrun will have been introduced and, therefore, any slight amount of overrun is effectively cancelled. Particularly, the friction brake is best shown in FIG. 6 and comprises a coil spring 170 disposed about a shaft 171 and located between a washer 172 supported from a wall of the housing 37 and another washer 173 seated against the gear 153. By this arrangement the tensive force of the spring 170 causes the washer 173 to produce a frictional drag force on the gear 153 and hence the gear train leading to the counter 125. Thus, incident to deenergization of the clutch 116 and disengagement of the motor 126 from the gear train, the spring 170 acts immediately to arrest the movement of the gear train and the counter 125.

In addition, a magnetic type brake may be substituted for the friction brake and to this end, it is likewise included in the counter gear chain described above. More specifically, there may be added a friction brake circuit in which there is included a pair of contacts controlled by the operation of a modified pivotal armature 140a. Specifically, the pivotal armature 140a includes, in addition to the contacts 118 another pair of contacts which are closed when the contacts 118 are open, thereby to complete the energizing circuit for the magnetic brake coincident with the magnetic deenergization of the gear motor 26. By this arrangement, the counter 25 is arrested immediately when the torsion balance apparatus is in a condition of equilibrium and the amount of over-run is restricted if not eliminated.

The apparatus 10 prior to a moisture-measuring operation may be balanced with the aid of the electrical circuit rather than with the hand wheel 27. If the left hand of the beam 21 is resting on the upper stop arm 73, the hand wheel 27 is rotated to move the torsion wire in a clockwise direction until the beam end is lowered into abutting engagement with the lower stop arm 74. The torsion wire 20 will then be twisted or preloaded in a clockwise direction. The control knob 121 of the timer motor 120 is turned until the contacts 127 are closed and the gear motor 26 operated. Incident to energization of the gear motor 26, the right end of the torsion wire 20 is rotated or untwisted in an anticlockwise direction, thereby to unload the preloaded wire 20 and rotate the balance beam 21 until the contacts 70a and 73a are closed. As described above, the gear motor 26 then is deenergized and the rotary motion of the wire 20 arrested. Since the counter 25 is drivingly connected to the wire 20, it must then be reset to its zero indicating position by adjustment of the reset knob 87. It will be appreciated that the foregoing operation is merely preliminary and is accomplished in order to condition the apparatus 10 for a moisture-measuring operation.

To conduct a moisture-measuring test, as described above, the hand wheel 27 is rotated so that the right end of the wire is again moved in a clockwise direction until the counter 25 moves through its entire indicating range and returns to a preloaded zero-indicating position. A sample of the material 23 is placed on the pan 61 until limit switch contacts 70a and 73a are closed. At the point of true equilibrium, the contacts 70a and 73a will repeatedly open and close, thereby to continuously energize and deenergize the relay 140 with its attendant chattering. A pilot light 129 mounted adjacent the right end of the front panel 13 and connected in parallel with the relay 140 is flashed on and off so that both a visual and audio signal is obtained to inform the operator of the balanced condition of the apparatus 10. Once the beam 21 has been rebalanced, the hand wheel 27 is again rotated to preload the wire 20 in a clockwise direction thereby to effect another unbalance of the wire 20 in order to prevent the repeated making and breaking of the contacts 70a and 73a.

Depending upon the characteristics of the sample 23, the heater unit 24 is properly positioned above the sample 23, the heater control dial or wheel 113 is adjusted so that the heater unit 24 develops the required temperature, and the timer control dial or wheel 121 is set in accordance with the optimum heating time for the sample. The movement of the control knob 121 actually initiates the cyclic operation of the apparatus 10. After at least a 30-second period during which the sheathed heating element 91 is preheated, the knob 97 is manually pulled forward to move the heater unit 24 from its non-heating to its heating position immediately above the sample 23. As indicated above, the time sequence of operation of the apparatus 10 is effected under the control of the timer motor 120. After a lapse of a predetermined period of time, the timer motor 120 causes the contacts 128 to close momentarily thereby completing a circuit from ground through the secondary winding of the transformer 135, the reset relay 141, the contacts 128 to ground, with the result that the result relay 141 is operated to reset the relay armature 140a to condition the gear motor-latching relay circuit for operation. After an elapse of time of the order of 30 seconds to 5 minutes, depending upon the relative positions of the cams 124 and 125, the contacts 127 are closed under the control of the timer motor 120 to cause the energization of the gear motor 26, the clutch 116 and the latching magnet 105. Coincident with the energization of the relay 105, the cam 99 is unlatched with the result that the heater unit 24 is rotated under the influence of the spring 100 back into its non-heating position. The energized gear motor 26 drives the right end of the torsion wire 20 in an anti-clockwise direction until the balance beam 21 is rotated anti-clockwise (as viewed from the right end of the wire) about the axis of the torsion wire 20 back into its balanced condition. In response to the closure of the contacts 70a and 73a, the relay 140 is energized and the contacts 118 are latched open, with the result that the latching relay 105, the clutch 116 and the gear motor are simultaneously deenergized.

Both the audio signal of the shattering relay 140 and the video signal of the flashing lamp 129 provide an indication to the operator that the moisture-measuring operation has been completed. This audio and video signal continues for approximately 90 seconds until the timer motor returns to its off position wherein the contacts 126 are opened to deenergize the timer motor 120, case light 130, heater unit 24 and the transformer 135, with the result that the entire system is shut down. In ordinary practice, the operator observes the reading on the digital counter 25 and replaces the sample 23 during the 90-second period, so continuous measurements may be made on a series of samples without turning off the heater unit 24.

When the beam 21 is returned to its balanced condition, the torsion wire 20 is in an angular position different from the angular position it occupied immediately after balancing of the beam with the sample 23 in the pan assembly. This condition exists since the weight of the sample 23 has decreased because of the evaporation of the moisture contained therein. The difference in angular position of the right end of the wire is detected by the counter 25 which provides a numerical indication of the percent of moisture contained in the sample. Since the amount of the sample 23 placed on the pan 61 was effectively equated to one thousand parts by preloading the wire 20 until the counter moved through a thousand units, the amount of moisture contained in the sample may be read directly from the counter 25. The reading is in percent to the nearest tenth of a percent when a decimal point is placed between the right and center digit on the counter.

It should be observed that the reading is preserved indefinitely so that an operator need not be present at the conclusion of the moisture-measuring operation. In fact, once the control knob 121 is set and the knob 95 pulled, the entire operation is automatic and the apparatus is shut off after the run is completed without manual attention. Furthermore, an accurate record of the moisture percentage of the sample is obtained even though the sample may begin to regain moisture immediately after the heater unit is moved to its non-heating position.

In accordance with yet another modified form of the first embodiment of the torsion balance apparatus 10, it should be appreciated that a D.C. motor may be substituted for the A.C. motor 26 so that a polarized signal could be used to control the direction of rotation of the motor. With this arrangement, the right end of the torsion wire 20 may be driven in either a clockwise or an anti-clockwise direction, instead of only one direction available with the A.C. motor. Hence, the hand wheel 27 might be entirely eliminated, and the preloading of the torsion wire 20 obtained with the use of the D.C. motor operated by the polarized signal. Furthermore, the D.C. motor can also be operated as a brake to instantaneously arrest the rotation of the torsion wire 20 and the counter 25.

It will be appreciated that by supporting the beam contact arm 70 on the arm 74 immediately beneath the upper contact arm 73, and thus restricting the rotational movement of the beam 70 and pan assembly 22, the change in inertia of the beam and pan assembly attributed to the change in weight of the sample effected during a heating operation is substantially eliminated. This result is obtained since the change in the rate at which the beam and pan assembly starts to move (the rate being a function of inertia of the weight of the beam, the pan assembly and the sample) becomes insignificant as the distance the beam and pan assembly must travel approaches zero. Hence, although the inertia of the beam, pan assembly, and sample is different because of the change of weight of the sample during a heating operation and the time required to move the beam is different before and after a heating operation, thus time difference is appreciably reduced as the distance the arm contact 70a is required to move to engage the contact 73a is reduced.

In accordance with a second embodiment of the present invention, the torsion balance apparatus 10 is used as a torsion balance device and not as a moisture-measuring device and, in this connection, the simplified electrical circuit, as shown in FIG. 8, is substituted for the electrical circuit shown in FIG. 3. Specifically, the timer 120, the manual knob 121, the cams 123, 124, 125, the heating unit 24, and the latching mechanism for the heating unit are eliminated and switches 180 and 181 respectively having wipers 180a and wipers 181a and 181b are substituted for the switches 126, 127 and 128, the wipers 180a, 181a and 181b being movable to their closed positions to respectively engage contacts 180b, 181c and 181d. It will be understood that the remaining components of the apparatus 10 are employed in the torsion balance device and the same reference numerals used to identify these components in FIGS. 1 through 7 are used to identify them in FIG. 8.

In operation as a torsion balance, the apparatus 10 is first balanced as described above. Briefly, to this end, the torsion wire 20 is preloaded by manually rotating the knob 27 so that the wire 20 is moved in a clockwise direction, and the switches 180 and 181 are manually closed. The closure of the switches 180 and 181 causes three separate circuits to be completed. First, a circuit is completed by the engagement of the wiper 181b with the contact 181c for causing the line voltage 117 to energize the transformer 135. Second, a circuit is completed by engagement of the wiper 180a with the contact 180b to cause the secondary winding of the transformer 135 to energize the reset relay 141 with the result that the reset relay armature 141a sets the armature 140a of the latching relay 140 in a position wherein the contacts 118 are closed. The switch 180 is of the type which effects disengagement of the wiper 180a and contact 180b after a predetermined short interval of time, i.e., 5 seconds, whereby this relay circuit is reopened after the reset relay 141 has performed its function during the 5-second interval of resetting the latching relay armature 140a. Third, a circuit is completed by the closure of the contacts 180b to cause the energization of the motor 26 by the line voltage 117. As described above, incident to operation of the motor 26, the right end of the torsion wire is untwisted in an anti-clockwise direction until the torsion bar 21 and pan assembly 22 are moved into a balanced position wherein the contacts 70a and 73a are in engagement. The closure of the contacts 70a and 73a causes the secondary winding of the transformer 135 to energize the relay 140 which actuates the armature 140a to open the contacts 118, whereby the gear motor 26 is deenergized. The switches 180 and 181 are thereafter opened to open their associated circuits. The counter 25 is then set to zero to provide a reference for the balanced position of the torsion balance device. The preliminary balancing steps are now completed and the apparatus is conditioned to be used as a torsion balance. It will be appreciated that the functional balancing of the apparatus 10 when used as a moisture testing device or as a torsion balance is identical but that the procedure involved is different because of the different equipment employed.

After balancing of the torsion balancing device is effected, the right end of the torsion wire 20 is twisted approximately 240° in a clockwise direction, so that the counter 25 passes through all of its counting positions and, returns to its zero indicating position. Thereafter, an object to be weighed is placed on the pan assembly 22. It should be noted that only objects having a weight less than the indicating or weight measuring capacity of the counter 25 may be weighted by the torsion balance device. Thus, only objects having a weight less than the maximum weight indicatable by the indicating cylinders 81 may be used since if an object having a weight more than the maximum indicatable weight were used and the wire was preloaded in such a manner as to move the counter 25 several times through its zero position, an operator would be unable to determine whether the counter had been moved back through its zero indicating position once, twice or thrice after the apparatus is rebalanced. Alternatively, however, a different type of counter 25 leaving another indicating cylinder 81 may be used so that the measuring range of the counter may be extended and the weight of the objects to be measured thereby increased.

In order to determine the actual weight of the object on the pan assembly, the switches 180 and 181 are reclosed and, as described above, the transformer 135 is energized, the reset relay 141 is temporarily energized for a 5-second interval to cause a closure of the contacts 118, and the gear motor 26 is energized. The operation of the gear motor causes the torsion bar 21 and pan assembly 22 to move into a new balance condition wherein the contacts 70a and 73a are closed. The closure of these contacts, as described above, causes the energization of the relay 140 with the result that the contacts 118 are opened and the rotation of the gear motor 26 arrested. In this new balanced condition, the counter 25 provides as indication representative of the weight of the object and it will be appreciated that the digits of the counter 25 may be calibrated directly in units of weight so that the actual weight of the object may be read directly from the counter 25.

While there have been described what are at present considered to be the preferred embodiments of the invention, it will be understood that various modifications may be made therein which are within the true spirit and scope of the invention as defined in the appended claims.

What is claimed as new and desired to be obtained by Letters Patent of the United States is:

1. A precision weighing device for measuring the moisture content of material comprising a torsion member, a balance beam secured to and carried by said torsion member, a container means suspended from one end of said balance beam for housing a sample of said material, indicia means in driving engagement with said torsion member for indicating the relative angular position of said member, timer means for controlling a moisture-measuring cycle of predetermined time duration, means connected to said torsion member for changing the angular position of both said member and beam and actuating said indicia means, said changing means being operated under the control of said timer means after the sample has been heated for a designated period of time, means operable in response to the movement of said beam into a balanced condition for rendering ineffective said changing means so that an accurate indication of the moisture content of the sample is obtainable from said indicia means.

2. A precision weighing device for measuring the weight change of material comprising a torsion member, a balance beam attached to said torsion member, operative means operable in response to a balanced condition of said balance beam, indicia counter means attached to said member to indicate the angular position of said member and beam, adjusting means including a prime mover for adjusting said angular position of said member, timer means for actuating said prime mover after a predetermined period of time, thereby to operate said indicia means, means responsive to said operative means to render said prime mover ineffective, and means included in said adjusting means for disengaging said prime mover from said torsion member when said prime mover is rendered ineffective so that said indicia counter means provides an exact indication of the relative angular position of said torsion member when said beam is in its balanced condition.

3. In a precision weighing device for measuring the weight loss of material, a torsion member, a balance beam secured to said member, container means suspended from said beam for supporting a sample of said material, heater means removably mounted on said frame to heat the sample and cause weight loss in said sample, means for displacing said heater means from a position adjacent said sample to a position remote from said sample so that the sample is not heated by said heater means, and timer means for operating said displacing means after a predetermined period of time.

4. The device of claim 3 wherein said heater means includes a sheathed heating unit a portion of which supports the entire heater means and is attached to a rotatable rod.

5. In a precision weighing device for measuring the moisture content of material, a frame, a torsion member, a balance beam secured to said member, container means suspended from said beam for supporting a sample of said material, a rod rotatably mounted in said frame, a heater means including a sheathed heating element which is attached to said rotatable rod, means for rotating said rod to move said sheathed heating element between a sample heating position and a non-heating position, and timer means for actuating said moving means after the sample has been heated for a predetermined period of time, whereby the sheathed heating element is moved to its non-heating position to prevent charring or burning of the sample.

6. A precision weighing device comprising a torsion member, a balance beam secured to and carried by said torsion member, means in driving engagement with one end of said torsion member for rotating said beam about the axis of said member into a balanced condition, control means operative in response to said balanced condition of said beam for rendering said rotating means ineffective, means operatively associated with said torsion member for recording a weighing indication when said beam is brought to a balanced condition, and adjustable timer means included in said control means for rendering said rotating means ineffective for a predetermined time interval.

7. A precision weighing device comprising a frame, a torsion member supported adjacent its ends by said frame, a balance beam fixedly secured to the torsion member intermediate its ends, means operative in response to a balanced condition of said beam, means in driving engagement with said torsion member to rotate said balance beam into a balanced condition, means responsive to said operative means for rendering said rotary means ineffective when said balance beam is moved into said balanced condition, means operatively associated with said torsion member for recording a weighing indication when said beam is brought to a balanced condition, and adjustable control means for rendering said rotating means ineffective for a predetermined period of time.

8. A precision weighing device for measuring the moisture content of material comprising a torsion member, a balance beam carried by said torsion member, container means attached to said beam for supporting a sample of said material, means connected to said torsion member for balancing said beam, indicia counter means drivingly connected to said torsion member, prime mover means in selective driving engagement with said member for moving said member and beam from an unbalanced position to a balanced position, and control means inoperable for a predetermined period of time during which said member and beam are in an unbalanced position and operable after the predetermined period of time to actuate said prime mover means to move said members and beam into a balanced position wherein said indicia means indicates the moisture percentage of the sample.

9. A weighing apparatus comprising a frame, a balancing device, means for supporting said balancing device from said frame, a support means carried by said balancing device, means for providing a weighing indication in driving engagement with said balancing device, means including a prime mover and a driving connection in driving engagement with said balancing device for moving said balancing device into a balanced condition, means operable to actuate said prime mover to cause said balancing device to move into a balanced condition, means operable when said balancing device achieves a balanced condition to render said prime mover ineffective, and means operable incident to said prime mover being rendered ineffective to immediately arrest said driving connection so that said weighing indication means provides an accurate indication of the balanced condition of the balancing device.

10. A weighing apparatus comprising a frame, a balancing device, means for supporting said balancing device from said frame, a support means carried by said balancing device, means for providing a weighing indication in driving engagement with said balancing device, means including a prime mover in driving engagement with said balancing device to move it into a balanced condition, means operable to actuate said prime mover to move said balancing device into a balanced condition, means operable when said balancing device achieves a balanced condition to deenergize said prime mover, and means included in said moving means for disengaging said prime mover from said balancing device when said prime mover is de-energized so that said weighing indication means provides an accurate indication of the balanced condition of the balancing device.

11. Apparatus for treating material comprising a frame, a balancing device, means for supporting said balancing device from said frame, support means carried by said balancing device, heater means supported from said frame to heat said material, control means operable after a predetermined period of time, and means operable in response to said control means after a predetermined period of time for displacing said heater means from a position adjacent to said support means to a position remote from said support means so that said material is not heated by said heater means.

References Cited in the file of this patent

UNITED STATES PATENTS

| | | |
|---|---|---|
| 1,952,171 | Jones | Mar. 27, 1934 |
| 2,124,968 | Ahrndt et al. | July 26, 1938 |
| 2,222,140 | De Iongh | Nov. 19, 1940 |
| 2,541,915 | Culver | Feb. 13, 1951 |
| 2,574,395 | Jack et al. | Nov. 6, 1951 |
| 2,577,415 | Gall | Dec. 4, 1951 |
| 2,579,914 | Ensign et al. | Dec. 25, 1951 |
| 2,614,825 | Kadlec et al. | Oct. 21, 1952 |
| 2,624,564 | Carmichael | Jan. 6, 1953 |
| 2,662,762 | Meinig | Dec. 15, 1953 |
| 2,694,566 | Wolter | Nov. 16, 1954 |
| 2,816,437 | Hornberger et al. | Dec. 17, 1957 |
| 2,832,215 | Brabender | Apr. 29, 1958 |
| 2,842,351 | Rodder et al. | July 8, 1958 |
| 2,884,239 | Ghezzi | Apr. 28, 1959 |

FOREIGN PATENTS

| | | |
|---|---|---|
| 475,959 | Canada | Aug. 7, 1951 |
| 898,689 | Germany | Dec. 3, 1953 |
| 1,013,903 | Germany | Aug. 14, 1957 |

OTHER REFERENCES

Waters etc.: "New types of recording differential thermobalances," Journal of Scientific Instruments, vol. 35, February 1958, pp. 41–46. (Copy in Div. 66.)